United States Patent
Hayakawa et al.

(10) Patent No.: US 7,678,457 B2
(45) Date of Patent: Mar. 16, 2010

(54) DIELECTRIC AND DISPLAY DEVICE HAVING A DIELECTRIC AND DIELECTRIC MANUFACTURING METHOD

(75) Inventors: Keiichiro Hayakawa, Tokyo (JP); Masakatsu Kuroki, Kanagawa (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 373 days.

(21) Appl. No.: 11/725,945

(22) Filed: Mar. 20, 2007

(65) Prior Publication Data

US 2007/0224429 A1    Sep. 27, 2007

Related U.S. Application Data

(60) Provisional application No. 60/784,643, filed on Mar. 23, 2006.

(51) Int. Cl.
   *B32B 17/06* (2006.01)
   *B05D 3/02* (2006.01)

(52) U.S. Cl. .......... 428/426; 501/15; 501/20; 501/26; 501/79; 501/49; 427/372.2

(58) Field of Classification Search ........... 501/15, 501/20, 26, 79, 49; 427/372.2
   See application file for complete search history.

(56) References Cited

U.S. PATENT DOCUMENTS

| | | | |
|---|---|---|---|
| 2,760,863 A | 8/1956 | Plambeck, Jr. | |
| 2,850,445 A | 9/1958 | Oster | |
| 2,875,047 A | 2/1959 | Oster | |
| 2,927,022 A | 3/1960 | Martin et al. | |
| 3,074,974 A | 1/1963 | Gegura | |
| 3,097,096 A | 7/1963 | Oster | |
| 3,097,097 A | 7/1963 | Oster at al. | |
| 3,145,104 A | 8/1964 | Oster et al. | |
| 3,380,381 A | 4/1968 | Musgrave | |
| 3,427,161 A | 2/1969 | Laridon et al. | |
| 3,479,185 A | 11/1969 | Chambers, Jr. | |
| 3,549,367 A | 12/1970 | Chang et al. | |
| 3,849,190 A * | 11/1974 | Foster et al. | 313/587 |
| 4,162,162 A | 7/1979 | Dueber | |
| 5,032,490 A | 7/1991 | Nebe et al. | |
| 6,897,610 B1 * | 5/2005 | Aoki et al. | 313/586 |
| 7,208,430 B2 * | 4/2007 | Hasegawa et al. | 501/15 |

FOREIGN PATENT DOCUMENTS

| | | | |
|---|---|---|---|
| JP | 08-050811 | | 2/1996 |
| JP | 2004-318116 | | 1/2004 |
| WO | WO 00/67283 | * | 9/2000 |

* cited by examiner

*Primary Examiner*—Gwendolyn Blackwell

(57) ABSTRACT

This invention provides a thick-film type dielectric with desired adhesivity to the base and very good insulation properties. The dielectric of the present invention includes a lower dielectric layer made of a photosensitive composition and an upper dielectric layer which is made of a photosensitive composition and formed on the aforementioned lower dielectric layer. The softening point (T1) of the primary glass powder used for the aforementioned lower dielectric layer, the softening point (T2) of the primary glass powder used for the aforementioned upper dielectric layer, and the firing temperature (T3) of the aforementioned primary glass powder satisfy the following relationship: $T1<T3<T2<T3+30°$ C.

37 Claims, 4 Drawing Sheets

DIELECTRIC AND DISPLAY DEVICE HAVING A DIELECTRIC AND DIELECTRIC MANUFACTURING METHOD

TECHNICAL FIELD

The present invention pertains to dielectric used for display in a display device. More specifically, the present invention pertains to dielectric arranged in the light emitting part of a display in a display device. The present invention also pertains to a display device having said dielectric and a method for manufacturing said dielectric.

BACKGROUND OF THE INVENTION

In recent years, various types of flat panel display devices have been developed. Although different display devices have different light emitting theories, electrodes are arranged in all kinds of display devices, and light emission is controlled by applying voltage between the electrodes. For example, in FED (Field Emission Display), electrons released from the field emitter are supplied to a phosphor to emit light. When light emission is controlled by turning on/off said electrodes, a dielectric (insulator) is arranged around each electrode for various purposes. For example, an insulating material is arranged between the electroconductive parts in order to insulate the area between the electroconductive parts. Insulating material is also arranged to partition electrodes.

Even if a dielectric and insulator have the same composition, they are sometimes are called a "dielectric" and sometimes called an "insulator", depending upon the position and purpose of the arrangement. Consequently, the insulating material arranged around the electrode is called "dielectric" hereinafter. However, the technical range hereinafter is not limited by the method of use. The "dielectric" mentioned in the technology described below includes both "dielectrics" and "insulators".

Glass powder and inorganic filler can be used as the dielectric material. Pattern printing or etching methods using photoresist can be used to form the dielectric pattern. However, it is difficult to form fine pattern by means of pattern printing. In the etching method using photoresist, the etching object is usually limited to a thin film. Since the insulating material arranged between electroconductive parts must be a thick film, the etching method using photoresist is inappropriate for this application. In order to form a thick film as the insulating material, a technology using a photosensitive insulator thick film paste to form a fine pattern was developed.

Examples of insulator paste include glass paste and inorganic filler paste. When manufacturing a display device (for example a flat panel display), a glass substrate is used almost exclusively as the base substrate, and the firing temperature is limited to be 600° C. or lower, preferably, 550° C. or lower. In this case, if an inorganic filler is contained in the paste, sintering will be restrained, making it difficult to obtain a compact dielectric. Consequently, it is preferred to use glass paste mainly composed of glass when manufacturing a display device. Under this premise, the following technology is identified which uses a photosensitive insulator paste to form fine patterns.

Japanese Kokai Patent Application No. Hei 8[1996]-50811 discloses a photosensitive glass paste for use in a plasma display panel, containing glass powder, an acrylic copolymer containing carboxyl groups and ethylenic unsaturated groups in the side chain or at the molecular terminal, a photoreactive compound, and a photopolymerization initiator. When this photosensitive insulating glass paste is used to form a dielectric pattern, first, the glass paste is coated on a substrate, followed by drying to evaporate the solvent. Then, a photomask is used to expose a prescribed pattern. As a result of exposure, the organic photosensitive binder in the exposed part is crosslinked and polymerized, but not developed. The unexposed part is developed by means of alkali development to obtain a non-sintered dielectric in the desired pattern. After that, it is sintered at a desired temperature to obtain a dielectric. However, Japanese Kokai Patent Application No. Hei 8[1996]-50811 does not disclose a thick film type dielectric with good adhesivity to a desired base nor does it disclose a dielectric with very good insulation properties.

Japanese Kokai Patent Application No. 2004-318116 discloses a glass powder type photosensitive paste, which is a photosensitive paste containing fine oxide particles with particle size in the range of 0.005-0.08 μm, inorganic particles other than fine oxide particles, and a photosensitive organic component, and has the average refractive index N1 of the fine oxide particles and the organic component and the average refractive index N2 of the inorganic particles other than the fine oxide particles satisfying the following formula:

$$-0.07 \leq N2-N1 \leq 0.07 (N2>1.65)$$

However, this reference does not disclose any thick film type dielectrics with good adhesivity to a desired base and very good insulation property. Also, lead-containing glass has been used as the aforementioned glass powder type photosensitive paste. As consciousness of environmental protection is being raised on the global scale, using lead-type glass should be avoided as much as possible. On the other hand, it is difficult to find equal or better characteristics (for example, said adhesivity and/or insulation property) compared with those of dielectrics manufactured using lead-type glass.

The purpose of the present invention is to provide a thick-film type dielectric with good adhesivity to a desired base (for example, substrate) and very good insulation properties. Also, preferably, the purpose of the present invention is to provide an environment-friendly lead-free type dielectric.

SUMMARY OF THE INVENTION

The present invention relates to a dielectric comprising a lower dielectric layer and an upper dielectric layer formed on said lower dielectric layer, said lower dielectric layer comprising a first primary glass powder and said upper dielectric layer comprising a second primary glass powder wherein the softening point (T1) of said first primary glass powder, the softening point (T2) of said second primary glass powder, and the firing temperature (T3) of the primary glass powder which is present in the greatest volume satisfies the following relationship: T1<T3<T2<T3+30° C.

The present invention further relates to a dielectric manufacturing method having the following steps:
 providing a lower dielectric composition and an upper dielectric composition each comprising a primary glass powder, resin binder, and organic solvent;
 providing a substrate;
 coating said lower dielectric composition on said substrate;
 drying said lower dielectric composition and substrate to form a lower dielectric layer;
 coating said upper dielectric composition on said lower dielectric layer;
 drying said upper dielectric composition to form an upper dielectric layer;
 firing said lower dielectric layer and said upper dielectric layer at a firing temperature that satisfies the relationship of $T1<T3<T2<T3+30°$ C. wherein T1 is the softening point of the primary glass powder of the lower dielectric layer, T2 is the softening point of the primary glass powder of the upper dielectric layer, and T3 is the firing temperature of the primary glass powder which is present in the greatest amount by volume.

When the lower and upper dielectrics are sintered under the condition that the softening point (T1) of the primary glass powder is used for the aforementioned lower dielectric layer, the softening point (T2) of the primary glass powder used for the aforementioned upper dielectric layer, and the firing temperature (T3) satisfy the relationship of $T1<T3<T2<T3+30°$ C., a dielectric with desired adhesivity to the base and good insulation property can be obtained.

DETAILED DESCRIPTION OF THE INVENTION

Figure 1:
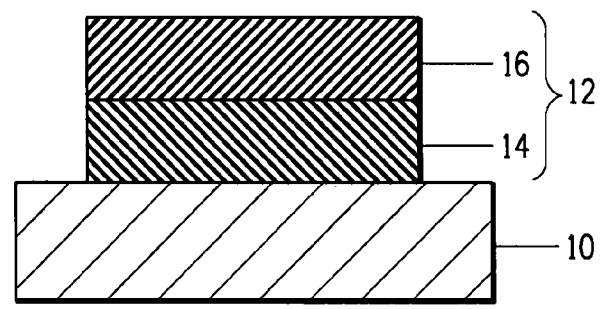
FIG. 1 is a diagram illustrating an example, in which a two-layer dielectric is formed on a substrate.

The present invention provides a dielectric characterized by the fact that the dielectric has a lower dielectric layer and an upper dielectric layer formed on the aforementioned lower dielectric layer, and the softening point (T1) of the primary glass powder used for the aforementioned lower dielectric layer, the softening point (T2) of the primary glass powder used for the aforementioned upper dielectric layer, and the firing temperature (T3) of the aforementioned primary glass powder satisfy the relationship of $T1<T3<T2<T3+30°$ C. Said primary glass powder refers to the glass powder with the largest content measured in volume when multiple glass powders are used (i.e., for purposes of determining T3, the firing temperature (T3) refers to the firing temperature of either the first primary glass powder or the firing temperature of the second primary glass powder, whichever is present in a greater volume. Typical firing temperatures are 600° C. or lower. In one embodiment, the firing temperature is 550° C. or lower. In a further embodiment, the firing temperature is in the range of 500° C. to 600° C. The dielectric of the present invention can be formed using a photosensitive composition or by printing a paste in a prescribed pattern.

T1 and T3 are preferred to satisfy the relationship of $T3-30°$ C.$<T1<T3$. Also, the primary glass powder used for the aforementioned lower dielectric layer and/or upper dielectric layer can be amorphous at the firing temperature of the dielectric.

For the dielectric of the present invention, the primary glass powder used for the aforementioned lower dielectric layer and/or upper dielectric layer can be contained in an amount of 50-100 volume % with respect to the total amount of the glass components in the dielectric layers. The aforementioned lower dielectric layer and/or upper dielectric layer can contain glass as the only inorganic component.

For the dielectric of the present invention, the primary glass powder used for the aforementioned lower and upper dielectric layers is desired to be a bismuth-type glass powder. The primary glass powder used for the aforementioned lower dielectric layer is desired to be Bi—Al—B—Si—Zn—Ba based glass powder or Bi—Al—B—Si—Zn—Ca based glass powder. The primary glass powder used for the aforementioned upper dielectric layer is desired to be Bi—Al—B—Si—Zn—Ba based glass powder or Bi—Al—B—Si—Zn—Ca based glass powder.

Also, for the aforementioned dielectric in one embodiment (when the dielectric composition is a photosensitive dielectric composition), it is desired for the primary glass powder used for the aforementioned upper dielectric layer to contain at least one element selected from the group consisting of Fe, V, Ti, Cu, and Co.

In addition, it is desired that the primary glass powders used for the aforementioned lower and upper dielectric layers virtually contain no lead, the aforementioned lower and upper dielectric layers virtually contain no filler, and/or the aforementioned lower and upper dielectrics virtually contain no alkaline compound.

The present invention includes a display device using the aforementioned dielectric.

The present invention further relates to a dielectric manufacturing method having the following steps: providing a lower dielectric composition and an upper dielectric composition each comprising a primary glass powder, resin binder, and organic solvent; providing a substrate; coating said lower dielectric composition on said substrate; drying said lower dielectric composition and substrate to form a lower dielectric layer; coating said upper dielectric composition on said lower dielectric layer; drying said upper dielectric composition to form an upper dielectric layer; firing said lower dielectric layer and said upper dielectric layer at a firing temperature that satisfies the relationship of $T1<T3<T2<T3+30°$ C. wherein T1 is the softening point of the primary glass powder of the lower dielectric layer, T2 is the softening point of the primary glass powder of the upper dielectric layer, and T3 is the firing temperature of the primary glass powder which is present in the greatest amount by volume.

One embodiment of the present invention provides a dielectric having a lower dielectric layer and an upper dielectric layer formed on the aforementioned lower dielectric layer, and the softening point (T1) of the primary glass powder used for the aforementioned lower dielectric layer, the softening point (T2) of the primary glass powder used for the aforementioned upper dielectric layer, and the firing temperature (T3) satisfy the relationship of $T1<T3<T2<T3+30°$ C. In particular, the dielectric of the present invention is a thick-film type dielectric which provides desired adhesivity to a base (for example, a substrate, including a glass substrate) and very good insulation properties. Consequently, the dielectric of the present invention can be arranged properly in a light emitting part in a display device. The dielectric of the present invention has excellent adhesivity and insulation properties since it has two layers, each of which has a specific relative softening point, and a specific firing temperature is adopted during manufacture.

The dielectric of the present invention can be formed using a photosensitive composition or by printing a paste in a prescribed pattern. When a photosensitive composition is used, monomer and initiator are added into the photosensitive composition. A prescribed pattern is exposed on the coating film of the photosensitive composition, followed by development to obtain a dielectric in a prescribed pattern. When a photosensitive composition is used, it is possible to form a fine pattern. It is also possible to coat a paste in a prescribed pattern by means of screen printing, etc. When this method is used, a dielectric in a prescribed pattern can be obtained by drying and firing the coating film. In this case, it is preferred that the softening point of the primary glass powder used for the aforementioned lower dielectric layer be lower than the firing temperature but higher than the temperature that is lower than the firing temperature by 30° C. In other words, it is preferred that T1 and T3 satisfy the relationship of T3−30° C.<T1<T3. Also, the primary glass powder used for the aforementioned lower dielectric layer and/or upper dielectric layer is preferred to be amorphous at the firing temperature of the dielectric. The content of the primary glass powder used for the aforementioned lower dielectric layer and/or upper dielectric layer is preferred to be in the range of 50-100 volume % with respect to the total amount of the glass components in the dielectric layers. The desired adhesivity to the base and insulation properties can be realized by adopting the aforementioned limiting items. It is preferred for the aforementioned lower dielectric layer and/or upper dielectric layer to contain glass as the only inorganic component.

The primary glass powder used for the aforementioned lower dielectric layer and upper dielectric layer is preferred to be a bismuth-type glass powder. The desired adhesivity to the base and the insulation property can be further improved by using a bismuth-type glass powder. Examples of said bismuth-type glass powder include Bi—Al—B—Si—Zn—Ba based glass powder and Bi—Al—B—Si—Zn—Ca based glass powder.

The desired adhesivity to the base and the insulation property can be further improved if the primary glass powder used for the aforementioned upper dielectric layer further contains at least one element selected from the group consisting of Fe, V, Ti, Cu, and Co.

It is preferred that the aforementioned lower dielectric layer and upper dielectric layer virtually contain no lead (essentially lead free) in order to make contribution to global environment protection. It is preferred that the aforementioned lower dielectric layer and upper dielectric layer virtually contain no inorganic filler (essentially filler free), so that firing can be performed at low temperature, and the manufacturing efficiency can be improved. Also, it is preferred that the aforementioned lower dielectric layer and upper dielectric layer virtually contain no alkaline compound (essentially alkaline free), so that the electric reliability of the dielectric can be improved.

The present invention is characterized by the fact that the dielectric has two layers (a lower dielectric layer and upper dielectric layer), and the softening point (T1) of the primary glass powder used for the aforementioned lower dielectric layer, the softening point (T2) of the primary glass powder used for the aforementioned upper dielectric layer, and the firing temperature (T3) of the aforementioned primary glass powder satisfy the relationship of T1<T3<T2<T3+30° C.

Various parameters affect the adhesivity of the dielectric to a base layer and its insulation properties. Among these are the relationship between the softening temperature of the glass used and the firing temperature. It was found that when a primary glass powder with a softening point lower than the firing temperature is used, the adhesivity of the dielectric to substrate or other base layer can be increased, but there is a high possibility for bubbles forming from the glass as a result of active fusion of the glass. This will adversely affect the compactness and may also increase the possibility of poor insulation. On the other hand, if a glass powder with a softening point higher than the firing temperature is used, there is almost no possibility for bubbling to occur, but the adhesivity of the glass to the base layer is poor, which will increase the possibility of poor adhesion/poor insulation.

Since the aforementioned adhesivity and compactness are opposite properties, it is difficult to obtain a dielectric that can satisfy both of the aforementioned properties by forming one layer of dielectric on a substrate. Both of these properties can be realized by forming dielectric layer 12 on substrate 10 as a two-layer structure (lower dielectric layer 14, upper dielectric layer 16), as shown in FIG. 1.

The softening point of the primary glass powder used for the lower dielectric layer should be lowered in order to realize good adhesivity to a substrate or other base layer.

When electrodes made of a normal metal are arranged on and below the lower and upper dielectric layers, if the compactness of the dielectric layers is not good enough and pinholes are formed, the metal will penetrate into the pinholes to cause poor insulation. Consequently, the present inventors found that the softening point of the primary glass powder used for the upper dielectric should be raised in order to guarantee satisfactory compactness of the dielectric in the upper dielectric layer that is vulnerable to penetration of the metal.

Based on the aforementioned results, it appears beneficial for the softening point of the upper dielectric composition to be higher than that of the lower dielectric composition.

It has been found that if the firing temperature is raised when using a primary glass powder with a specific softening point; a compact dielectric could be obtained until a certain firing temperature. However, if the firing temperature is raised too high, bubbling will occur in the dielectric, which will deteriorate the compactness of the dielectric. Also, as described above, if satisfactory compactness cannot be realized for the upper and lower dielectrics when the dielectric has a two-layer structure, the lower dielectric layer might be separated from the upper dielectric layer.

An appropriate firing temperature should be higher than the softening point of the primary glass powder used for the lower dielectric layer but lower than the softening point of the primary glass powder used for the upper dielectric layer. It has also been found that the temperature difference between the softening point of the primary glass powder used for the upper dielectric layer and the firing temperature should not be too large. In other words, the softening point (T1) of the primary glass powder used for the aforementioned lower dielectric layer, the softening point (T2) of the primary glass powder used for the aforementioned upper dielectric layer, and the firing temperature (T3) of the aforementioned primary glass powder should satisfy the relationship T1<T3<T2<T3+30° C.

Based on the aforementioned results, the present inventors drew a conclusion that good adhesivity to the base and very good insulation properties can be realized when the dielectric is formed in two layers (lower dielectric layer and upper dielectric layer), and the softening point of the primary glass powder contained in the upper dielectric layer is higher than that of the primary glass powder contained in the lower dielectric layer, and firing is performed under the condition of T1<T3 and T3<T2<T3+30° C. This is the main point of the present patent application.

Composition of the Dielectric

In the present invention, a composition for upper dielectric and a composition for lower dielectric are prepared and are used to form the upper dielectric layer and the lower dielectric layer, respectively.

If there is a photosensitive composition in the dielectric composition, it contains (1) glass powder, (2) monomer, (3) initiator, (4) resin binder, and (5) organic solvent. If the dielectric composition is not a photosensitive composition and the pattern is formed by means of screen printing or other application known to those skilled in the art, it is also possible to eliminate (2) monomer and (3) initiator from the dielectric composition. The composition may also contain antioxidants, anti-thickening agents, UV absorbents, or other additives well known to those skilled in the art, as other additives (other components) (6). It is preferred, although not necessary, that the dielectric composition comprise the glass powder (glass component) as the only inorganic component. If the glass component is the only inorganic component, compact sintered structure of the powdery components can be obtained easily at a relatively low temperature during firing.

(1) Glass Powder

For the dielectric of the present invention, the softening points of the main glasses used for the upper and lower dielectric layers are controlled. As described above, "primary glass powder" refers herein to the glass powder with the largest content measured in volume when multiple glass powders are used. For example, if the composition contains 50 volume % of glass powder A, 30 volume % of glass powder B, and 20 volume % of glass powder C, the primary glass powder is glass powder A. The content of the primary glass powder is preferred to be in the range of 50-100 volume %, more preferably, in the range of 80-100 volume % with respect to the total amount of the glass components used in the dielectric to form the dielectric layer. The content of the primary glass powder used for the upper dielectric layer can be different from that of the primary glass powder used for the lower dielectric layer.

When there are two or more main glasses, the requirement of the present invention is considered to be met if at least one of the main glasses meets the requirement on the softening point specified in the present invention. For example, if 50 volume % of glass A and 50 volume % of glass B are used, it is good enough if either glass A or glass B satisfy the requirement on the softening point.

In the present invention, softening point T2 of the primary glass powder contained in the upper dielectric layer is higher than firing temperature T3. Also, T2 is set not to be higher than T3 by more than 30° C. More preferably, T2 is set not to be higher than T3 by more than 15° C. That is, T3<T2<T3+15° C. If this temperature range is satisfied, reduced or no pinholes will be formed on the upper dielectric layer, and good compactness can be realized so that poor insulation can be prevented.

In the present invention, the softening point of the primary glass powder in the lower dielectric layer is lower than the firing temperature. It is preferred that this softening point be lower than the firing temperature but higher than the temperature that is lower than the firing temperature by 30° C. That is, T3−30° C.<T1<T3. More specifically, T3−15° C.<T1<T3. When this temperature range is satisfied, adhesion of the lower dielectric layer to the base can be realized.

The firing temperature is preferred to be in the range of 500-600° C., more preferably, in the range of 520-570° C. in order to prevent poor insulation caused by diffusion of the metal component from the electrode into the dielectric layer. The firing temperature in this patent application refers to the peak heating temperature when a coated film is sintered. For example, if the temperature is raised from room temperature to 520° C. and kept at 520° C. for 20 min, followed by cooling, the firing temperature is 520° C., which is the highest temperature.

When a glass powder other than the primary glass powder (referred to as "secondary glass powder" sometimes hereinafter) is contained in the dielectric layer, the softening point of the secondary glass powder can be different from the softening point of the primary glass powder and can also be out of the softening point range specified for the primary glass powder in the present patent application. Glass of various components can be used as the secondary glass as demanded.

Also, the primary glass powder used for the aforementioned lower dielectric layer and/or upper dielectric layer is preferred to be amorphous at the firing temperature of the dielectric. If it is amorphous at the firing temperature, the compacting process can be carried out uniformly along with fusion of the glass. On the other hand, if it is crystallized at the firing temperature, the compactness may be adversely affected along with crystallization, leading to poor insulation.

Although there is no special limitation on the primary glass powder, it is preferred that lead-free glass powder is used, in consideration of the influence on the environment. For example, it is preferred to use bismuth-type glass powder that virtually contains no lead (essentially lead-free). The reason is that its glass design for forming a compact sintered film as a result of fusion performed at a low temperature of 500-600° C. is easy compared with other lead-free glasses. Also, since the glass design is easy, it is easy to manufacture a dielectric containing no alkali metal, whose presence in dielectric is undesired. Here, "virtually containing no lead" means that containing lead as an inevitable impurity is allowed. The lead content is preferred to be 100 ppm or lower, more preferably, 1 ppm or lower. It is even more preferred that the lead content couldn't be detected by the currently available analyzers.

Examples of the preferred composition of the primary glass powder are Bi—Al—B—Si—Zn—Ba based glass and Bi—Al—B—Si—Zn—Ca based glass. It is preferred to use these bismuth-type glasses because amorphous glass can be obtained at the desired softening point (in the range of 500-600° C.). he total content of the Bi—Al—B—Si—Zn—Ba based glass or Bi—Al—B—Si—Zn—Ca based glass is preferred to be in the range of 40-100 weight % with respect to the total glass content of the dielectric layer. In the case of 100 weight %, it means that all of the contained glass powder is Bi—Al—B—Si—Zn—Ba based glass or Bi—Al—B—Si—Zn—Ca based glass.

If necessary, it is also possible to use a primary glass powder having other compositions. Examples of other compositions include B—Si, Zn—B—Si, Al—B—Si, Bi—Zn—Si—Al, etc.

The glass contained in the upper dielectric layer is preferred to further contain at least one element selected from the group consisting of Fe, V, Ti, Cu, and Co. When the glass contains these elements, the UV transmissivity becomes low, and the exposure is reduced. As a result, the productivity can be improved. The weight of these elements measured in the weight of the oxides of these elements is preferred to be in the range of 0.1-2.0 weight % with respect to the weight of the glass powder.

The softening point of the primary glass powder can be measured by means of differential thermal analysis (DTA).

The content of the primary glass powder is usually in the range of 50-70 weight % with respect to the total amount of the dielectric composition. However, the present invention is not limited to this range.

(2) Monomer

When light is irradiated on the dielectric composition, the monomer is polymerized into a polymer. In the exposed area, the monomer contained in the composition is polymerized to form a cured substance that is not eliminated during development.

There is no special limitation on the type of the monomer. For example, a monomer component containing at least one type of ethylenic unsaturated compound capable of addition polymerization and having at least one polymerizable ethylene group can be used as the photocurable monomer component in the present invention.

This type of compound can start formation of a polymer by the presence of free radicals to carry out chain-extending addition polymerization. The monomer compound is in non-gas state, that is, has a boiling point higher than 100° C. It can also plasticize organic polymeric binder.

Examples of preferred monomers that can be used either alone or in combination with other monomers include t-butyl (meth)acrylate, 1,5-pentanediol di(meth)acrylate, N,N-dimethyl aminoethyl(meth)acrylate, ethylene glycol di(meth)acrylate, 1,4-butanediol(meth)acrylate, diethylene glycol di(meth)acrylate, hexamethylene glycol di(meth)acrylate, 1,3-propanediol(meth)acrylate, decamethylene glycol di(meth)acrylate, 1,4-cyclohexanediol di(meth)acrylate, 2,2-dimethylolpropane di(meth)acrylate, glycerol di(meth)acrylate, tripropylene glycol di(meth)acrylate, glycelol tri(meth)acrylate, trimethylol propane tri(meth)acrylate, compounds described in U.S. Pat. No. 3,380,381, 2,2-di(p-hydroxyphenyl)-propane di(meth)acrylate, pentaerythritol tetra(meth)acrylate, triethylene glycol diacrylate, polyoxyethyl-1,2-di-(p-hydroxyethyl)propane dimethacrylate, bisphenol A di-[3-(meth)acryloxy-2-hydroxypropyl)ether, bisphenol A di-[2-(meth)acryloxyethyl)ether, 1,4-butanediol di-(3-methacryloxy-2-hydroxypropyl)ether, triethylene glycol dimethacrylate, polyoxypropyl trimethylol propane triacrylate, butylene glycol di(meth)acrylate, 1,2,4-butanediol tri (meth)acrylate, 2,2,4-trimethyl-1,3-pentanediol di(meth)acrylate, 1-phenylethylene-1,2-dimethacrylate, diallyl fumarate, styrene, 1,4-benzenediol dimethacrylate, 1,4-diisopropenyl benzene, 1,3,5-triisopropenyl benzene (here, (meth)acrylate means both acrylate and methacrylate).

The useful compounds are ethylenic unsaturated compounds with a molecular weight of at least 300, such as $C_2$-$C_{15}$ alkylene glycol or polyalkylene glycol having 1-10 ether bonds, the compounds disclosed in U.S. Pat. No. 2,927,022, such as alkylene or polyalkylene glycol diacrylate manufactured from compounds having ethylene bonds and capable of addition polymerization, especially, when there are terminal groups. U.S. Pat. No. 2,927,022, in its entirety, is hereby incorporated by reference herein.

Other useful monomers are disclosed in U.S. Pat. No. 5,032,490 which, in its entirety, is hereby incorporated by reference herein.

Preferred monomers include polyoxyethylenated trimethylolpropane tri(meth)acrylate, ethylated pentaerythritol triacrylate, trimethylolpropane tri(meth)acrylate, dipentaerythritol monohydroxypentaacrylate, and 1,10-decanediol dimethacrylate.

Other preferred monomers include monohydroxy polycaprolactone monoacrylate, polyethylene glycol diacrylate (molecular weight about 200), and polyethylene glycol dimethacrylate (molecular weight about 400).

The content of the monomer can be appropriately determined depending on the type of the monomer used. In general, the content of the monomer is in the range of 2-10 weight % with respect to the total amount of the dielectric composition.

(3) Initiator

The initiator is used to start polymerization of the monomer when it absorbs light. There is no special limitation on the type of the initiator. For example, an initiator that is thermally inactive at a temperature of 185° C. or lower, but generates free radicals when exposed to light can be used as the photo initiator in the present invention. These photo initiators include substituted or non-substituted polynuclear quinones, which have two intramolecular rings in a conjugated carbon ring system. Examples include 9,10-anthraquinone, 2-methyl anthraquinone, 2-ethyl anthraquinone, 2-t-butyl anthraquinone, octamethyl anthraquinone, 1,4-naphthoquinone, 9,10-phenanthrenequinone, benzoanthracene-7,12-dione, 2,3-naphthacene-5,12-dione, 2-methyl-1,4-naphthoquinone, 1,4-dimethyl anthraquinone, 2,3-dimethyl anthraquinone, 2-phenyl anthraquinone, 2,3-diphenyl anthraquinone, retenequinone, 7,8,9,10-tetrahydronaphthacene-5,12-dione, and 1,2,3,4-tetrahydrobenzoanthracene-7,12-dione. Other useful photo initiators are disclosed in U.S. Pat. No. 2,760,863 (however, some of them are thermally active even at a low temperature, such as 85° C.; they are vicinal ketaidonyl alcohol, such as benzoin or pivaloin; methyl and ethyl ethers of benzoin or other acyloin ethers; hydrocarbon substituted aromatic acyloins including α-methyl benzoin, α-allyl benzoin, α-phenyl benzoin, thioxantone and its derivatives, and hydrogen donors). U.S. Pat. No. 2,760,863, in its entirety, is hereby incorporated by reference herein.

Photoreductive dyes and reducing agents can be used as the initiator. Examples include those disclosed in U.S. Pat. No. 2,850,445, U.S. Pat. No. 2,875,047, U.S. Pat. No. 3,09796, U.S. Pat. No. 3,074,974, U.S. Pat. No. 3,097,097, and U.S. Pat. No. 3,145,104, as well as phenazine, oxazine, and quinones, such as Michler's ketone, ethyl Michler's ketone, benzophenone, and other 2,4,5-triphenyl imidazoyl dimers along with hydrogen donors including leuco dyes, and their mixtures (disclosed in U.S. Pat. No. 3,427,161, U.S. Pat. No. 3,479,185, and U.S. Pat. No. 3,549,367), which are hereby incorporated by reference herein, in their entireties. The sensitizers described in U.S. Pat No. 4,162,162 can be used along with the photo initiators and photo inhibitors.

The type and content of the initiator should be determined appropriately depending on the type of the monomer used. In general, the content of the initiator is in the range of 0.1-5 weight % with respect to the total amount of the dielectric composition.

(4) Resin Binder

Resin binder can help to form a dielectric with sufficient hardness. The polymer is formed by polymerizing the monomer to guarantee a certain degree of hardness of the formed dielectric. In most cases, however, that is not enough. Therefore, a resin binder is usually added into the dielectric composition. There is no special limitation on the type of the resin binder. As described above, the polymeric binder is an assistant constituent element in the electroconductive composition. It is preferred to select a resin binder with high resolution in consideration of the possibility of water-based development. The following binders can satisfy the aforementioned conditions. In other words, these binders include (1) non-acidic comonomers containing $C_1$-$C_{10}$ alkyl acrylate, $C_1$-$C_{10}$ alkyl methacrylate, styrene, substituted styrene, or their mixtures and (2) copolymers or interpolymers (mixed polymers) manufactured acidic comonomers containing ethylenic unsaturated carboxylic acid containing parts in an amount of at least 15 weight % of the total weight of the polymers.

Presence of acidic comonomer component in the composition has an effective function. With the aid of these acidic functional groups, development can be carried out in an aqueous base, such as a 0.4 weight % aqueous solution of sodium carbonate. If the concentration of the acidic comonomer is less than 15%, the composition cannot be completely washed out by the aqueous base. If the concentration of the acidic comonomer is more than 30%, the composition has low stability under development conditions, and only partial development occurs in the image forming part. Examples of an appropriate acidic comonomer include acrylic acid, meth-acrylic acid, crotonic acid, or other ethylenic unsaturated monocarboxylic acids, as well as fumaric acid, itaconic acid, citraconic acid, vinyl succinic acid, maleic acid, or other ethylenic unsaturated dicarboxylic acids, their hemiesters, and, in some cases, their anhydrides and their mixtures. Methacryl polymers are more preferred than acryl polymers since they can be combusted more cleanly in a low-oxygen atmosphere.

If the aforementioned non-acidic comonomer is the aforementioned alkyl acrylate or alkyl methacrylate, it is preferred that the non-acidic comonomer constitutes at least 50 weight %, preferably, 70-75 weight % of the polymeric binder. If the non-acidic comonomer is styrene or substituted styrene, it is preferred that the non-acidic comonomer constitutes 50 weight % of the polymeric binder, while the other 50 weight % is constituted with the hemiester of maleic anhydride or other acid anhydride. The substituted styrene is preferred to be α-methyl styrene.

Although not preferred, the non-acidic part of the polymeric binder can also contain about 50 weight % or less of other non-acidic comonomer that substitutes the alkyl acrylate, alkyl methacrylate, styrene, or substituted styrene part of the polymer. Examples include acrylonitrile, vinyl acetate, and acryl amide. In this case, however, since complete combustion becomes more difficult, the amount of such monomer is preferred to be less than about 25 weight % of the total amount of the polymeric binder. Copolymers can be used either alone or in combination as the binder as long as the aforementioned conditions are satisfied. It is also possible to add a small amount of other polymeric binders in addition to the aforementioned copolymers. Examples include polyethylene, polypropylene, polybutylene, polyisobutylene, ethylene-propylene copolymer or other polyolefins, and polyethers, such as polyethylene oxide and other lower alkylene oxides.

These polymers can be manufactured by means of solution polymerization technology that is generally used in the acrylic ester polymerization field.

Typically, the aforementioned acidic acrylic ester polymer can be manufactured as follows. α- or β-ethylenic unsaturated aid (acidic comonomer) is mixed with one or several types of copolymerizable vinyl monomers (non-acidic comonomers) in an organic solvent with a relatively low boiling point (75-150° C.) to obtain a 10-60% monomer mixture solution. Then, a polymerization catalyst is added into the obtained monomer to polymerize it. The obtained mixture is heated under normal pressure at the reflux temperature of the solvent to manufacture the aforementioned polymer. After the polymerization reaction is virtually completed, the generated acidic polymer solution is cooled to room temperature. A sample is recovered to measure the viscosity, molecular weight, and acid equivalent of the polymer.

The molecular weight of the aforementioned acid-containing polymeric binder is preferred to be smaller than 50,000.

The content of the resin binder should be determined appropriately depending on the type and content of the monomer as well as the types and contents of other components. In general, the content of the resin binder is in the range of 5-20 weight % with respect to the total amount of the dielectric composition.

(5) Organic Solvent

The dielectric composition contains an organic solvent. The main purpose of the organic solvent is to easily coat the dispersion of the finely powdered solid content of the dielectric composition on a ceramic substrate or other substrate. Consequently, first of all, it is preferred to use an organic solvent that can maintain the appropriate stability of the solid content and can disperse the solid content. Second of all, it is preferred to use an organic solvent, whose rheological characteristic can provide good coating characteristic to the dispersion.

The organic solvent can also be a solvent mixture. The solvent component should be selected appropriately so that the polymer and other organic components can be completely dissolved in it. The solvent should be inactive (will not react with) to other components in the paste composition. It is necessary to select a solvent with high volatility so that it can be evaporated from the dispersion even if it is coated at a relatively low temperature under atmospheric pressure. However, it is not desirable to use a solvent with such volatility that the paste dries quickly on a screen at normal room temperature during the printing operation. The solvent used for the paste composition is preferred to have a boiling point under normal pressure lower than 300° C., more preferably, lower than 250° C. Examples of such solvent include aliphatic alcohols, acetate or propionate, and other esters of the aforementioned alcohols; pine resin, α- or β-terpineol, or their mixture, and other terpenes; ethylene glycol, ethylene glycol monobutyl ether, butyl cellosolve acetate, and other esters of ethylene glycols; butyl carbitol, butyl carbitol acetate, carbitol acetate, and other carbitol esters; and Texanol® (2,2,4-trimethyl-1,3-pentanediol monoisobutylate), and other appropriate solvents.

The amount of the organic solvent should be determined in consideration of the viscosity required when coating the dielectric composition, as well as the types of contents of other components. In general, the content of the organic solvent is in the range of 15-40 weight % with respect to the total amount of the dielectric composition. Usually, a paste-like dielectric composition can be obtained by adding the organic solvent.

(6) Other Additives

In addition to the aforementioned components, the following additional components can also be added into the dielectric composition of the present invention. Examples of these additives include antioxidants, anti-thickening agents, UV absorbents, dyes, etc. It is also possible to add dispersants, stabilizers, plasticizers, peeling agents, stripping agents, defoaming agents, and wetting agents that are well used in this field into the composition. Appropriate substances that can be used are disclosed in U.S. Pat. No. 532,490, which, in its entirety, is hereby incorporated by reference herein. There is no special limitation on the contents of these additives, which should be determined appropriately depending on the required properties and the types of other materials. However, if an organic component is used, in order to prevent poor insulation caused by bubbling of the additives during firing, it is preferred to keep the amount of the organic component added as small as possible.

In the present invention, it is preferred that no filler be virtually contained in the lower and upper dielectric layers. If there is no filler contained, good compactness can be realized at even lower temperatures as a result of fusion of the glass. Here, "virtually containing no filler" means that containing of filler as an inevitable impurity is allowed. The content of the filler is preferred to be 20 weight % or less, more preferably, 5 weight % or less. It is most preferred that the content of filler could not be detected using the current analyzing devices.

In the present invention, it is preferred that the lower and upper dielectric layers virtually contain no alkaline compound. If there is no alkaline compound contained, it will be easy to avoid deterioration of the electrical reliability. This is because the alkaline ions with high mobility will cause short circuits or other problems. Here, "virtually containing no alkaline compound" means that containing of alkaline compound as an inevitable impurity is allowed. The content of the alkaline compound is preferred to be 1 weight % or less, more preferably, 0.1 weight % or less based on the amount of the alkali metal. It is most preferred that the content of alkaline compound could not be detected using the current analyzing devices.

Figure 2:
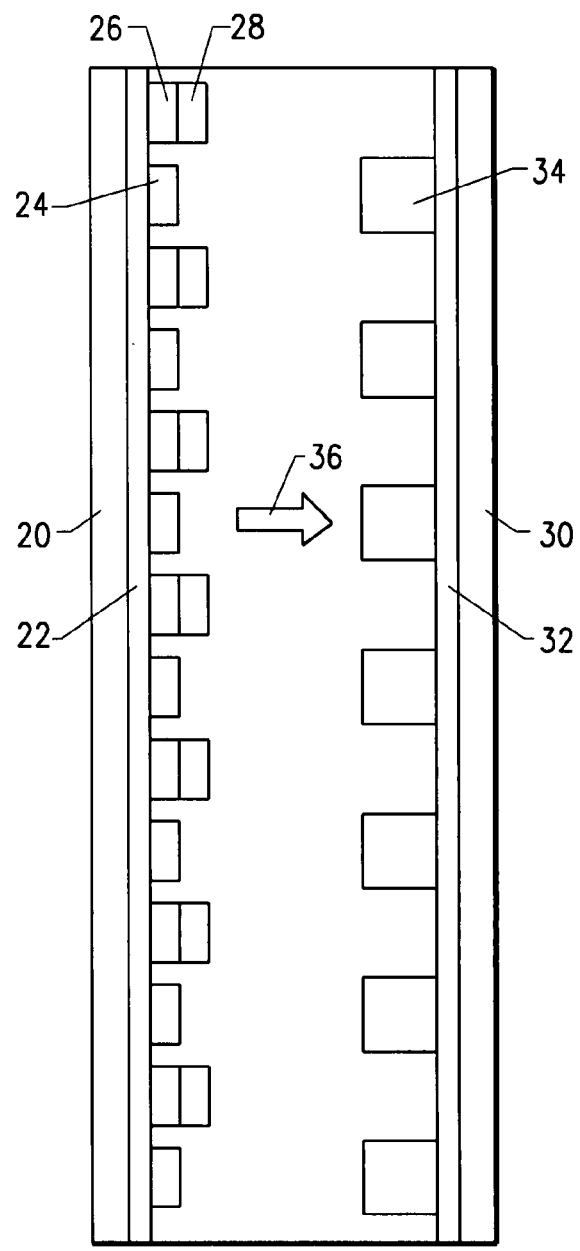
FIG. 2 is a diagram illustrating a device having the dielectric of the present invention.

The present invention includes a display device having the aforementioned dielectric. The display panel or device of the present invention can use Field Emission Display (FED). For FED, for example, as shown in FIG. 2, a laminated body formed by laminating cathode electrode 22, emitter 24, gate insulated film 26, and gate electrode 28 on glass substrate 20 and a laminated body formed by laminating anode electrode 32 and phosphor 34 on glass substrate 30 are arranged opposite each other, and light 36 is supplied from emitter 24 to phosphor 34. In this structure, the aforementioned dielectric of the present patent application can be arranged as gate insulated film 26 used to insulate cathode electrode 22 and gate electrode 28. In this case, the durability of the device itself can be improved by using the aforementioned dielectric with excellent accuracy of fine patterns.

The present invention includes a dielectric manufacturing method having the following steps: a lower dielectric composition containing glass powder, resin binder, and organic solvent is coated on a substrate; the aforementioned lower dielectric composition is dried to form a lower dielectric layer; an upper dielectric composition containing glass powder, resin binder, and organic solvent is coated on the aforementioned lower dielectric layer; the aforementioned upper dielectric composition is dried to form an upper dielectric layer; the aforementioned lower and upper dielectric layers are sintered at a firing temperature that satisfies the relationship of T1<T3<T2<T3+30° C. with respect to the softening point (T1) of the primary glass powder used for the aforementioned lower dielectric layer, the softening point (T2) of the primary glass powder used for the aforementioned upper dielectric layer, and the firing temperature (T3).

The dielectric composition used in the present invention can be a photosensitive composition. If the dielectric composition is a photosensitive composition, the lower and upper dielectric compositions contain monomer and initiator.

Figure 3:
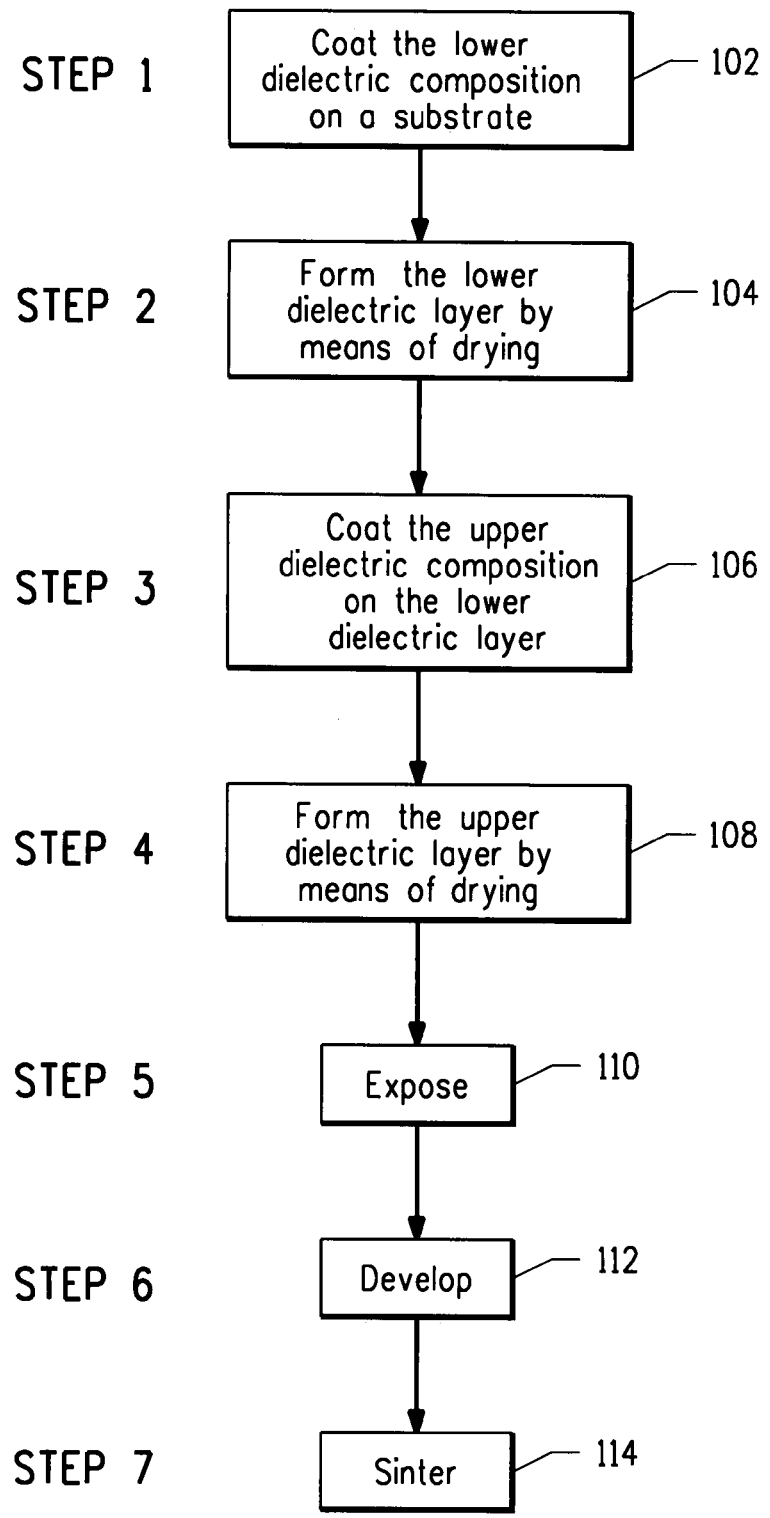
FIG. 3 is a flow chart illustrating each step in the dielectric manufacturing method of the present invention.

In the following, the manufacturing method of the present invention will be explained based on figures. In the manufacturing method to be explained below, the dielectric composition is a photosensitive composition. If the dielectric composition is a photosensitive composition, the composition is coated in a desired pattern by means of screen printing, followed by drying and firing. More specifically, the process includes the steps: (1) coat the lower dielectric composition, (2) dry, (3) coat the upper dielectric composition, (4) dry, (5) sinter the lower and upper dielectric layers. FIG. 3 is a flow chart illustrating each step in the dielectric manufacturing method of the present invention. As shown in this figure, the manufacturing method has steps 1-7. FIG. 4 shows more detail of each step shown in FIG. 3.

Figure 4A:
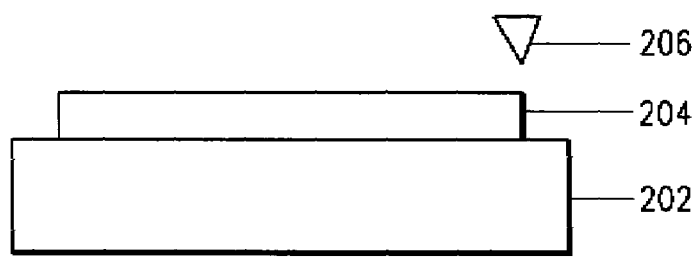
FIG. 4 is a diagram illustrating the details of each step shown in FIG. 3.

In the first step, lower dielectric composition (204) containing glass 10 powder, monomer, initiator, resin binder, and organic solvent is coated on substrate (202) (FIG. 3: 102, FIG. 4(A)). Said lower dielectric composition (204) is coated on the entire surface of glass substrate (202) by means of coating means (206) that performs screen printing or uses a dispenser.

Figure 4B:
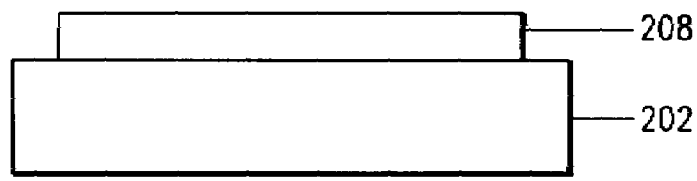

In the second step, the aforementioned lower dielectric composition is dried to form lower dielectric layer (208) (FIG. 3: 104, FIG. 4(B)). There is no special limitation on the drying condition as long as the electroconductive [dielectric] composition can be dried. Drying can be carried out using a conveyor type IR dryer at 100° C. for 10-20 min. The thickness of the dried lower dielectric layer is preferred to be in the range of 10-40 μm.

Figure 4C:
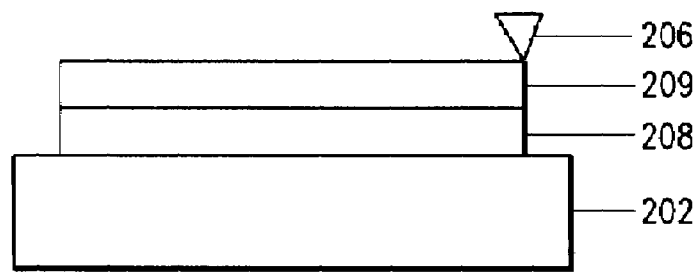

In the third step, upper dielectric composition (209) containing glass powder, monomer, initiator, resin binder, and organic solvent and having a higher softening point than the aforementioned lower composition dielectric coated on said lower dielectric layer (208) (FIG. 3: 106, FIG. 4(C)). The coating means used in the first step can be used.

Figure 4D:
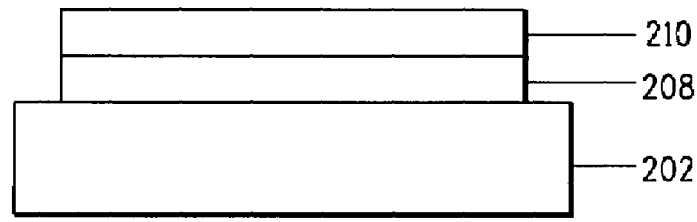

In the fourth step, the aforementioned upper dielectric composition is dried to form upper dielectric layer (210) (FIG. 3: 108, FIG. 4(D)). The conditions described in the second step can be used. The thickness of the dried upper dielectric layer is preferred to be in the range of 10-40 μm.

Figure 4E:
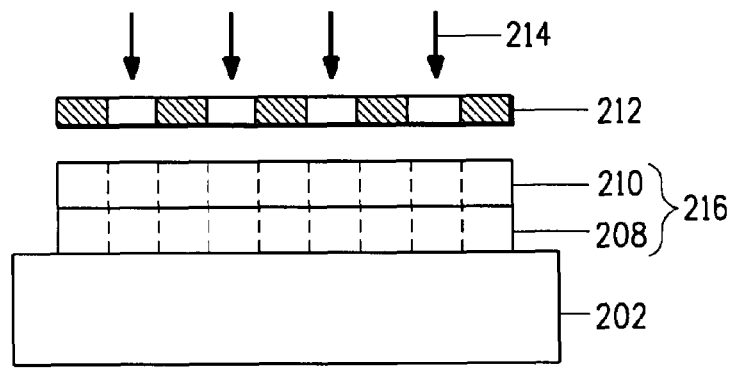

In the fifth step, a prescribed pattern is exposed on said lower dielectric layer (208) and upper dielectric layer (210) (FIG. 3: 110, FIG. 4(E)). Exposure is carried out by irradiating (214), for example, after photomask (212) having an electrode pattern is formed on dried upper and lower dielectric layers (208, 210). The exposure conditions vary depending on the components of the upper and lower dielectric compositions used and their film thickness. It is preferred to use light of 100-300 mJ/cm² for exposure using a gap of 50-300 μm. The irradiation time is preferred to be in the range of 5-30 sec. As a result, an exposed coating film (216) can be obtained.

Figure 4F:
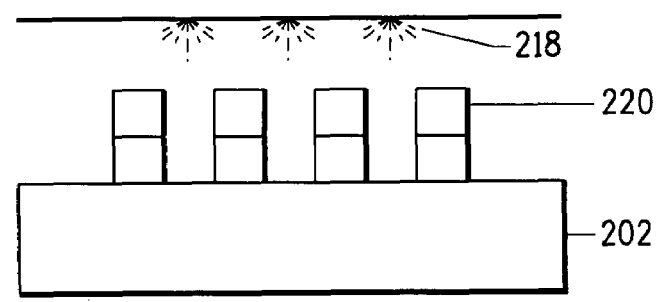

In the sixth step, the exposed coating film is developed (FIG. 3: 112, FIG. 4(F)). Development is carried out using an alkali solution. An example of the alkali solution that can be used is 0.4% sodium carbonate aqueous solution. Developed coating film (220) can be obtained by spraying said alkali solution (218) on the exposed coating film on substrate (202) by dipping substrate (202) having the exposed coating film in the alkali solution.

Figure 4G:
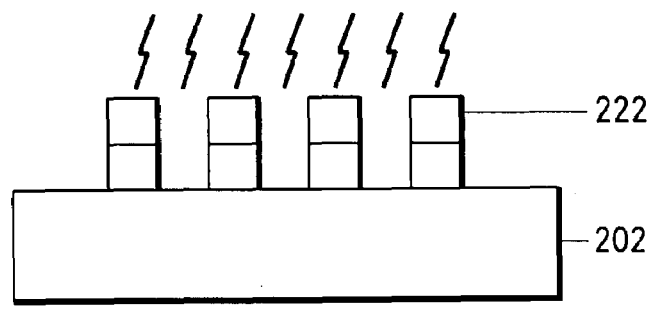

In the seventh step, the developed coating film is sintered at a firing temperature, which is higher than the softening point of the primary glass powder used for the aforementioned lower dielectric layer but lower than the softening point of the primary glass powder used for the aforementioned upper dielectric layer (FIG. 3: 114, FIG. 4(G)). Firing can be carried out in a firing furnace having a prescribed temperature profile. The highest temperature during firing is preferred to be in the range of 500-600° C. The firing time is preferred to be in the range of 1-3 h. After firing, cooling is performed to obtain dielectric (222) with a desired pattern. After drying, the thickness of the lower dielectric layer and the thickness of the upper dielectric layer are preferred to be in the range of 5-20 μm.

By using this manufacturing method, a two-layer dielectric (lower dielectric layer and upper dielectric layer) is obtained. Also, since the softening point of the upper dielectric composition is higher than that of the lower dielectric composition and the firing temperature is higher than the softening point of the primary glass powder used for the aforementioned lower dielectric layer but lower than the softening point of the primary glass powder used for the aforementioned upper dielectric layer, a dielectric with desired adhesivity to the base and excellent insulation property can be obtained.

The effect realized by the firing temperature and the softening points of the primary glass powders used for the upper and lower dielectric layers in the present invention has been explained above. The present invention also has other effects realized by the two-layer structure of the dielectric. That is, when a one-layer dielectric is formed, if a part in that layer is not well exposed, that part cannot be well cured, which may lead to poor insulation. On the other hand, when the two-layer dielectric is formed according to the present invention, even if pinholes are formed, the possibility that the pinholes formed in the two layers are aligned in the height direction of the dielectric is very low. Consequently, poor insulation can be prevented.

Besides the aforementioned advantage, a sufficient thickness can be guaranteed for the dielectric when the two-layer dielectric is formed according to the manufacturing method of the present invention.

EXAMPLES

In the following, the present invention will be explained in more detail with reference to application examples. The present invention, however, is not limited to these application examples. In the following application examples, percentage is based on weight if not specified otherwise.

Examples 1-4, Comparative Examples 1-42

Dielectric compositions were used to form dielectrics. These dielectric compositions were not photosensitive, and no monomer or initiator was contained in these compositions.

(A) Preparation of Glass Powder

The components listed in Table 1 were mixed to prepare the glass powder.

TABLE 1

|  | BaO | $B_2O_3$ | $SiO_2$ | $Al_2O_3$ | ZnO | $Bi_2O_3$ | $Fe_2O_3$ |
|---|---|---|---|---|---|---|---|
| Glass powder A | 2 | 10 | 1 | 1 | 12 | 74 | — |
| Glass powder B | 1 | 9 | 7 | 2 | 8 | 73 | 1 |
| Glass powder C | 1 | 9 | 7 | 2 | 8 | 72 | — |
| Glass powder D | 1 | 8 | 8 | 2 | 11 | 70 | — |

TABLE 1-continued

|  | BaO | $B_2O_3$ | $SiO_2$ | $Al_2O_3$ | ZnO | $Bi_2O_3$ | $Fe_2O_3$ |
|---|---|---|---|---|---|---|---|
| Glass powder E | 1 | 10 | 10 | 2 | 11 | 66 | — |
| Glass powder F | 1 | 8 | 15 | 3 | 13 | 60 | — |
| Glass powder G | 1 | 9 | 16 | 3 | 13 | 58 | — |
| Glass powder H | 6 | 11 | 18 | 4 | 17 | 44 | — |
| Glass powder I | 10 | 8 | 18 | 6 | 10 | 48 | — |

Table 2 shows the softening points and average particle sizes of these glass powders.

The softening point was measured by means of differential thermal analysis (DTA).

TABLE 2

|  | Softening point | Average particle size |
|---|---|---|
| Glass powder A | 450° C. | 1 μm |
| Glass powder B | 500° C. | 1 μm |
| Glass powder C | 500° C. | 1 μm |
| Glass powder D | 515° C. | 1 μm |
| Glass powder E | 530° C. | 1 μm |
| Glass powder F | 558° C. | 1 μm |
| Glass powder G | 568° C. | 1 μm |
| Glass powder H | 584° C. | 1 μm |
| Glass powder I | 601° C. | 1 μm |

(B) Preparation of Dielectric Composition

The glass powder was mixed with a medium (26% Texanol solution of MMA/BMA/EA/MAA copolymer) in a weight ratio of 1:1 to obtain paste-like dielectric compositions A-P. Table 3 shows the glass powder compositions (based on volume) of dielectric compositions A-P. For example, the glass powder contained in Dielectric composition A is made up of 100 volume percent Glass powder A. The glass compositions used are listed below.

TABLE 3

| | Glass powder composition (volume % of glass powder used in glass composition) | |
|---|---|---|
| Dielectric composition A | Glass powder A: 100 vol % | |
| Dielectric composition B | Glass powder B: 100 vol % | |
| Dielectric composition C | Glass powder C: 100 vol % | |
| Dielectric composition D | Glass powder D: 100 vol % | |
| Dielectric composition E | Glass powder E: 100 vol % | |
| Dielectric composition F | Glass powder F: 100 vol % | |
| Dielectric composition G | Glass powder G: 100 vol % | |
| Dielectric composition H | Glass powder H: 100 vol % | |
| Dielectric composition I | Glass powder I: 100 vol % | |
| Dielectric composition J | Glass powder B: 50 vol % | Glass powder D: 50 vol % |
| Dielectric composition K | Glass powder C: 50 vol % | Glass powder D: 50 vol % |
| Dielectric composition L | Glass powder C: 50 vol % | Glass powder E: 50 vol % |
| Dielectric composition M | Glass powder E: 50 vol % | Glass powder F: 50 vol % |
| Dielectric composition N | Glass powder F: 50 vol % | Glass powder G: 50 vol % |
| Dielectric composition O | Glass powder F: 50 vol % | Glass powder H: 50 vol % |
| Dielectric composition P | Glass powder G: 50 vol % | Glass powder I: 50 vol % |

(C) Formation of Dielectric

Dielectric compositions A-P were used to form 23 types of dielectrics with two-layer structure shown in Tables 4, 5. The process of forming the dielectric was described below.

A SUS 250-mesh screen mask was installed on a screen printer and was used to print the lower dielectric composition on a soda glass substrate with a thickness of 1.3 mm. A 5 cm×5 cm square coating film was obtained. After printing, a warm air-drying furnace was used to perform 20 min of drying at 100° C. The thickness of the obtained dried film was about 12-15 μm. Then, the same blank mask was used to print the upper dielectric composition on the dry film. After printing, warm air drying was perform in the same way for 30 min at 100° C. The dry film thickness of the obtained two-layer dielectric was about 23-30 μm as shown in Tables 4, 5. The obtained two-layer dielectric had a square shape of 5 cm×5 cm.

The obtained sample was sintered using a roller-hearth furnace with a total of 3 h firing profile, wherein the peak temperature of 520° C. or 570° C. was kept for 20 min. The relationship between the firing temperature and the softening points of the primary glass powders used for the upper and lower dielectric layers is also shown in Tables 4, 5. The following items with regard to the adhesivity of the dielectric to the base and its insulation property were evaluated for the aforementioned samples. Then, the conditions that satisfy good evaluation results were studied for all of the samples.

In this case, the adhesivity of the dielectric to the base, the bubbles in the dielectric and the density of the dielectric, as well as the aforementioned insulation property were evaluated.

Bubbles in Dielectric

A metal microscope (magnification 100-200, under the conditions of dark vision filed and transmitted light) was used to investigate the bubbles (size and number) in the sample of the sintered dielectric. Samples with no bubbles observed were considered acceptable. On the other hand, samples with micro-level bubbles and samples with observed bubbles of 3 μm or larger were considered unacceptable.

Density (4,5 fired density) was also measured. Samples which had no space, uniform fusion, and almost no bubbles, were considered acceptable. On the other hand, samples with a few uniformly distributed mud cracks or bubbles caused by sintering shrinkage of the powder during firing and samples with rough surface as well as serious mud cracks or bubbles were considered unacceptable.

Adhesivity to Base

After the aforementioned bubble observation, the sintered samples were scratched with a pincette to see if the dielectric could be removed from the base. Samples whose dielectric could not be removed from the base and had no damage were considered acceptable. On the other hand, samples whose dielectric was removed from the base were considered unacceptable.

The results of the aforementioned evaluation items are shown in Tables 4, 5. Table 4 shows the evaluation results when the peak temperature of the aforementioned firing temperature was 520° C., and Table 5 shows the evaluation results when the peak temperature of the aforementioned firing temperature was 570° C.

TABLE 4

|  | Application Example 1 | Application Example 2 | Comparative Example 1 | Comparative Example 2 | Comparative Example 3 | Comparative Example 4 |
| --- | --- | --- | --- | --- | --- | --- |
| Upper layer | E | L | A | B | C | D |
| Lower layer | B | B | A | B | C | D |
| Upper; delta (Main glass Ts - firing temp.) | +15 | +10/−20 | −70 | −20 | −20 | −5 |
| Lower; delta (Main glass Ts - firing temp.) | −20 | −20 | −70 | −20 | −20 | −5 |
| Dried Thickness (μm) | 23.6 | 25.0 | 30.0 | 24.9 | 26.2 | 25.6 |
| Bubbles | Acceptable | Acceptable | Unacceptable | Unacceptable | Unacceptable | Unacceptable |
| Fired Density | Acceptable | Acceptable | Unacceptable | Unacceptable | Unacceptable | Unacceptable |
| Adhesion on glass substrate | Acceptable | Acceptable | Acceptable | Acceptable | Acceptable | Acceptable |

|  | Comparative Example 5 | Comparative Example 6 | Comparative Example 7 | Comparative Example 8 | Comparative Example 9 | Comparative Example 10 |
| --- | --- | --- | --- | --- | --- | --- |
| Upper layer | E | F | G | H | I | J |
| Lower layer | E | F | G | H | I | J |
| Upper; delta (Main glass Ts - firing temp.) | +15 | +38 | +48 | +64 | +81 | −5/−20 |
| Lower; delta (Main glass Ts - firing temp.) | +15 | +38 | +48 | +64 | +81 | −5/−20 |
| Dried Thickness (μm) | 26.6 | 24.7 | 24.6 | 27.5 | 26.0 | 24.8 |
| Bubbles | Acceptable | Acceptable | Acceptable | Acceptable | Acceptable | Unacceptable |
| Fired Density | Unacceptable | Unacceptable | Unacceptable | Unacceptable | Unacceptable | Unacceptable |
| Adhesion on glass substrate | Acceptable | Unacceptable | Unacceptable | Unacceptable | Unacceptable | Acceptable |

|  | Comparative Example 11 | Comparative Example 12 | Comparative Example 13 | Comparative Example 14 | Comparative Example 15 | Comparative Example 16 |
| --- | --- | --- | --- | --- | --- | --- |
| Upper layer | K | L | M | N | O | P |
| Lower layer | K | L | M | N | O | P |
| Upper; delta (Main glass Ts - firing temp.) | −5/−20 | +10/−20 | +38/+90 | +48/+38 | +64/+38 | +48/+81 |
| Lower; delta (Main glass Ts - firing temp.) | −5/−20 | +10/−20 | +38/+90 | +48/+38 | +64/+38 | +48/+81 |

TABLE 4-continued

|  | | | | | | |
|---|---|---|---|---|---|---|
| Dried Thickness (μm) | 24.7 | 24.5 | 27.6 | 26.7 | 25.9 | 26.7 |
| Bubbles | Unacceptable | Acceptable | Acceptable | Acceptable | Acceptable | Acceptable |
| Fired Density | Unacceptable | Unacceptable | Unacceptable | Unacceptable | Unacceptable | Unacceptable |
| Adhesion on glass substrate | Acceptable | Acceptable | Acceptable | Unacceptable | Unacceptable | Unacceptable |

|  | Comparative Example 17 | Comparative Example 18 | Comparative Example 19 | Comparative Example 20 | Comparative Example 21 | Comparative Example 22 |
|---|---|---|---|---|---|---|
| Upper layer | D | F | H | I | J | K |
| Lower layer | B | B | B | B | B | B |
| Upper; delta (Main glass Ts - firing temp.) | −5 | +38 | +64 | +81 | −5/−20 | −5/−20 |
| Lower; delta (Main glass Ts - firing temp.) | −20 | −20 | −20 | −20 | −20 | −20 |
| Dried Thickness (μm) | 24.8 | 24.2 | 25.3 | 25.3 | 24.1 | 24.7 |
| Bubbles | Unacceptable | Acceptable | Acceptable | Acceptable | Unacceptable | Unacceptable |
| Fired Density | Acceptable | Unacceptable | Unacceptable | Unacceptable | Unacceptable | Unacceptable |
| Adhesion on glass substrate | Acceptable | Acceptable | Unacceptable | Unacceptable | Acceptable | Acceptable |

TABLE 5

|  | Application Example 3 | Application Example 4 | Comparative Example 23 | Comparative Example 24 | Comparative Example 25 | Comparative Example 26 |
|---|---|---|---|---|---|---|
| Upper layer | H | O | A | B | C | D |
| Lower layer | F | F | A | B | C | D |
| Upper; delta (Main glass Ts - firing temp.) | +14 | +14/−12 | −120 | −70 | −70 | −55 |
| Lower; delta (Main glass Ts - firing temp.) | −12 | −12 | −120 | −70 | −70 | −55 |
| Dried Thickness (μm) | 28.0 | 26.0 | 30.0 | 24.9 | 26.2 | 25.6 |
| Bubbles | Acceptable | Acceptable | Acceptable | Unacceptable | Unacceptable | Unacceptable |
| Fired Density | Acceptable | Acceptable | Unacceptable | Unacceptable | Unacceptable | Unacceptable |
| Adhesion on glass substrate | Acceptable | Acceptable | Acceptable | Acceptable | Acceptable | Acceptable |

|  | Comparative Example 27 | Comparative Example 28 | Comparative Example 29 | Comparative Example 30 | Comparative Example 31 | Comparative Example 32 |
|---|---|---|---|---|---|---|
| Upper layer | E | F | G | H | I | J |
| Lower layer | E | F | G | H | I | J |
| Upper; delta (Main glass Ts - firing temp.) | −55/−70 | −40 | −12 | −2 | +14 | +31 |
| Lower; delta (Main glass Ts - firing temp.) | −55/−70 | −40 | −12 | −2 | +14 | +31 |
| Dried Thickness (μm) | 24.8 | 26.6 | 24.7 | 24.6 | 27.5 | 26.0 |
| Bubbles | Unacceptable | Unacceptable | Unacceptable | Acceptable | Acceptable | Acceptable |
| Fired Density | Unacceptable | Unacceptable | Unacceptable | Unacceptable | Unacceptable | Unacceptable |
| Adhesion on glass substrate | Acceptable | Acceptable | Acceptable | Acceptable | Acceptable | Acceptable |

|  | Comparative Example 33 | Comparative Example 34 | Comparative Example 35 | Comparative Example 36 | Comparative Example 37 | Comparative Example 38 |
|---|---|---|---|---|---|---|
| Upper layer | K | L | M | N | O | P |
| Lower layer | K | L | M | N | O | P |
| Upper; delta (Main glass Ts - firing temp.) | −2/+31 | −2 | −55/−70 | −40/−70 | −12/40 | −2/−12 |
| Lower; delta (Main glass Ts - firing temp.) | −2/+31 | −12 | −55/−70 | −40/−70 | −12/40 | −2/−12 |
| Dried Thickness (μm) | 26.7 | 25.0 | 24.7 | 24.5 | 27.6 | 26.7 |
| Bubbles | Acceptable | Unacceptable | Unacceptable | Unacceptable | Unacceptable | Acceptable |
| Fired Density | Unacceptable | Unacceptable | Unacceptable | Unacceptable | Unacceptable | Unacceptable |
| Adhesion on glass substrate | Acceptable | Acceptable | Acceptable | Acceptable | Acceptable | Acceptable |

|  | Comparative Example 39 | Comparative Example 40 | Comparative Example 41 | Comparative Example 42 |
|---|---|---|---|---|
| Upper layer | G | I | N | P |
| Lower layer | F | F | F | F |
| Upper; delta (Main glass Ts - firing temp.) | +14/−12 | +31 | −2/−12 | −2/+31 |

TABLE 5-continued

| | | | | |
|---|---|---|---|---|
| Lower; delta (Main glass Ts - firing temp.) | +14/−12 | −12 | −12 | −12 |
| Dried Thickness 25.9 | (μm) | 25.0 | 25.5 | 25.5 |
| Bubbles | Acceptable | Acceptable | Unacceptable | Acceptable |
| Fired Density | Unacceptable | Unacceptable | Unacceptable | Unacceptable |
| Adhesion on glass substrate | Acceptable | Acceptable | Acceptable | Acceptable |

As can be seen from Table 4 (when the peak temperature of the aforementioned firing temperature was 520° C.), in Application Examples 1, 2, in which the softening point (T1) of the primary glass powder used for the lower dielectric layer, the softening point (T2) of the primary glass powder used for the upper dielectric layer, and the firing temperature (T3) of the primary glass powder satisfy the relationship of T1<T3<T2<T3+30° C., good results were obtained with regard to bubbles, density, and adhesivity to the glass substrate. On the other hand, in Comparative Examples 1-22 that do not satisfy the aforementioned relationship between softening point and firing temperature, at least one out of three evaluation items had poor result.

Also, as can be seen from Table 5 (when the peak temperature of the aforementioned firing temperature was 570° C.), in Application Examples 3, 4 good results were obtained with regard to bubbles, density, and adhesivity to the glass substrate. On the other hand, in Comparative Examples 23-42, at least one out of the three evaluation items had a poor result.

Application Examples 5-10

Photosensitive dielectric compositions were used to form a dielectric in order to confirm that the effects of the present invention could be realized in the same way even if dielectric was manufactured using photosensitive composition. Table 6 shows the compositions of the upper dielectric composition and the lower dielectric composition. Glass powder C and glass powder F were used in volume ratio of 1:1 as the glass powders for the upper dielectric composition. Glass powder B alone was used as the glass powder for the lower dielectric composition.

TABLE 6

| Description | Upper Dielectric | Lower Dielectric |
|---|---|---|
| medium B (wt %) | 3.55 | 1.77 |
| medium C (wt %) | 23.11 | 24.76 |
| solvent A (wt %) | 5.20 | 2.68 |
| monomer A (wt %) | 3.13 | 3.13 |
| monomer B (wt %) | 0.78 | 0.78 |
| Initiator (wt %) | 0.20 | 0.20 |
| Glass powder B (wt %) | — | 66.68 |
| Glass powder C (wt %) | 34.36 | — |
| Glass powder E (wt %) | 29.68 | — |
| Total (wt %) | 100.00 | 100.00 |

The details of each component used in Table 6 are shown in Table 7.

TABLE 7

| | |
|---|---|
| medium B | 36% Texanol solution of MMA/BMA/EA/MAA copolymer (Negami Chemical Industry) with 10.4% of Irgacure369/Irgacure651(Ciba Geigy Corp.) |
| medium C | 39% Texanol solution of MMA/BMA/EA/MAA copolymer |
| solvent A | Texanol |
| monomer A | Ethoxylated trimethylolpropane triacrylate |
| monomer B | LAROMER LR8967 (BASF Corp., polyether acrylate) |
| Initiator | 2,6-di-tert-butyl-4-methyl-phenol |

The aforementioned upper and lower dielectric compositions were used, and the exposure conditions and development conditions were changed to form 6 types of dielectrics of Application Examples 5-10 shown in Table 8. The process of forming the dielectric is described below.

A SUS 150-mesh screen mask was installed on a screen printer and was used to print the lower dielectric composition on a soda glass substrate with a thickness of 1.3 mm. A 5 cm×5 cm square coating film was obtained. After printing, a warm air-drying furnace was used to perform 20 min of drying at 100° C. The thickness of the obtained dried film was about 20 μm. Then, the same screen mask was used to print the upper dielectric composition on the dry film. After printing, warm air drying was perform in the same way for 30 min at 100° C. The dry film thickness of the obtained two-layer dielectric was about 40 μm. The obtained two-layer dielectric had a square shape of 5 cm×5 cm.

Pattern exposure was performed to the dry film via a photo mask for pattern evaluation using a UV exposure machine having a high-pressure mercury lamp that emits 365 nm light. Pattern exposure was performed to each sample under 3 exposure conditions in the range of 80-240 mJ/cm$^2$.

On the other hand, unexposed dry sample was prepared using an alkali development device using 0.4% $Na_2O_3$ aqueous solution as the developer. When the sample was developed, the time needed for complete development of the dry film (time to clear; TTC) was measured. The aforementioned pattern exposed sample was developed in 1.5 times or 3 times of TTC. In other words, developed samples of 3 exposure conditions×2 development conditions were obtained.

The obtained samples were sintered using a roller-hearth furnace with a total of 3 h of firing profile, wherein the peak temperature of 520° C. was kept for 20 min.

The aforementioned bubble, density, and adhesivity to the glass substrate were evaluated for the sintered samples. The evaluation methods described above were used. The results are shown in Table 8. The thickness of each sintered dielectric was 20 μm.

TABLE 8

|  | Application Example 5 | Application Example 5 | Application Example 7 | Application Example 8 | Application Example 9 | Application Example 10 |
| --- | --- | --- | --- | --- | --- | --- |
| exposure; mJ/cm2 | 80 | 80 | 160 | 160 | 240 | 240 |
| Develop; TTCx | 1.5 | 3 | 1.5 | 3 | 1.5 | 3 |
| Firing; °C. | 520 | 520 | 520 | 520 | 520 | 520 |
| Bubbles | Acceptable | Acceptable | Acceptable | Acceptable | Acceptable | Acceptable |
| Fired Density | Acceptable | Acceptable | Acceptable | Acceptable | Acceptable | Acceptable |
| Adhesion on glass substrate | Acceptable | Acceptable | Acceptable | Acceptable | Acceptable | Acceptable |

As can be seen from Table 8, in Application Examples 5-10, in which the softening point (T1) of the primary glass powder used for the lower dielectric layer, the softening point (T2) of the primary glass powder used for the upper dielectric layer, and the firing temperature (T3) of the primary glass powder satisfy the relationship of $T1<T3<T2<T3+30°$ C., good results were obtained with regard to bubbles, density, and adhesivity to the glass substrate. This result shows that when a photosensitive composition is used to form a dielectric, an excellent dielectric can be obtained in the same way by performing firing under the condition of $T1<T3<T2<T3+30°$ C.

As described above, good adhesivity to the base and a very good insulation property can be realized for the dielectric of the present invention under prescribed exposure conditions and development conditions. In particular, these characteristics can be realized even for a lead-free type dielectric.

Conventionally, since hybrid micro-circuits using alumina substrate can be sintered at a temperature as high as 850° C., even if a ceramic filler, etc. is mixed with the glass, it is still possible to form a dielectric layer with excellent adhesivity to the base and insulation property. However, it is difficult to form a display panel or device using glass substrate as the base. The aforementioned effect realized by the present invention has significant meaning because dielectric can be formed at a low cost without using the expensive process for thin film.

What is claimed is:

1. A dielectric comprising a lower dielectric layer and an upper dielectric layer formed on said lower dielectric layer, said lower dielectric layer comprising a first primary glass powder and said upper dielectric layer comprising a second primary glass powder wherein the softening point (T1) of said first primary glass powder, the softening point (T2) of said second primary glass powder, and the firing temperature (T3) of the primary glass powder which is present in the greatest volume satisfies the following relationship: $T1<T3<T2<T3+30°$ C.

2. The dielectric of claim 1 wherein the aforementioned lower and upper dielectric layers are made of a photosensitive composition.

3. The dielectric of claim 1 wherein T1 and T3 also satisfy the following relationship: $T3-30°$ C.$<T1<T3$.

4. The dielectric of claim 1 wherein one or more of the primary glass powders are amorphous at the firing temperature.

5. The dielectric of claim 1 wherein said first primary glass powder is present in said lower dielectric layer in the range of 50 to 100 volume percent, with respect to the total amount of the glass components in said lower dielectric layer.

6. The dielectric of claim 1 wherein said second primary glass powder is present in said upper dielectric layer in the range of 50 to 100 volume percent, with respect to the total amount of the glass components in said upper dielectric layer.

7. The dielectric of claim 1 wherein said first primary glass powder and said second primary glass powder are present in their respective dielectric layers in the range of 50 to 100 volume percent, with respect to the total amount of the glass components in their respective dielectric layers.

8. The dielectric of claim 1 wherein said lower dielectric layer consists essentially of glass as the only inorganic component.

9. The dielectric of claim 1 wherein said upper dielectric layer consists essentially of glass as the only inorganic component.

10. The dielectric of claim 1 wherein said lower dielectric layer and said upper dielectric layer consist essentially of glass as the only inorganic component.

11. The dielectric of claim 1 wherein the first primary glass powder and the second primary glass powders are bismuth-type glass powders.

12. The dielectric of claim 11 wherein the first primary glass powder is selected from a Bi—Al—B—Si—Zn—Ba based glass powder or a Bi—Al—B—Si—Zn—Ca based glass powder.

13. The dielectric of claim 11 wherein the second primary glass powder is selected from a Bi—Al—B—Si—Zn—Ba based glass powder or a Bi—Al—B—Si—Zn—Ca based glass powder.

14. The dielectric of claim 13 wherein said second primary glass powder further comprises at least one element selected from the group consisting of Fe, V, Ti, Cu, and Co.

15. The dielectric of claim 1 wherein said lower dielectric layer and said upper dielectric layer are essentially lead free.

16. The dielectric of claim 1 wherein said lower dielectric layer and said upper dielectric layer are essentially free of filler.

17. The dielectric of claim 1 wherein the said lower dielectric layer and said upper dielectric layer are essentially free of alkaline compounds.

18. A display device comprising the dielectric of claim 1.

19. A dielectric manufacturing method having the following steps:

providing a lower dielectric composition and an upper dielectric composition each comprising a primary glass powder, resin binder, and organic solvent;

providing a substrate;

coating said lower dielectric composition on said substrate;

drying said lower dielectric composition and substrate to form a lower dielectric layer;

coating said upper dielectric composition on said lower dielectric layer;

drying said upper dielectric composition to form an upper dielectric layer;

firing said lower dielectric layer and said upper dielectric layer at a firing temperature that satisfies the relationship of $T1<T3<T2<T3+30°$ C. wherein T1 is the softening point of the primary glass powder of the lower dielectric layer, T2 is the softening point of the primary glass powder of the upper dielectric layer, and T3 is the firing temperature of the primary glass powder which is present in the greatest amount by volume.

20. The dielectric manufacturing method of claim 19 wherein said lower dielectric composition and said upper dielectric composition are photosensitive compositions further comprising monomers and initiators, and wherein said method further comprises the steps of exposing a desired pattern or patterns on said lower dielectric layer and said upper dielectric layer to form an exposed lower dielectric layer and an exposed upper dielectric layer and developing the exposed layers after the aforementioned upper dielectric layer is formed.

21. The dielectric manufacturing method of claim 19 wherein T1 and T3 also satisfy the following relationship: T3−30° C.<T1<T3.

22. The dielectric manufacturing method of claim 19 wherein said firing temperature is in the range of 500° C. to 600° C.

23. The dielectric manufacturing method of claim 19 wherein said first primary glass powder or said second primary glass powder is amorphous at the firing temperature of the dielectric.

24. The dielectric manufacturing method of claim 19 wherein said first primary glass powder and said second primary glass powder are amorphous at the firing temperature of the dielectric.

25. The dielectric manufacturing method of claim 19 wherein said first primary glass powder is present in said lower dielectric layer in the range of 50 to 100 volume percent, with respect to the total amount of the glass components in said lower dielectric layer.

26. The dielectric manufacturing method of claim 19 wherein said second primary glass powder is present in said upper dielectric layer in the range of 50 to 100 volume percent, with respect to the total amount of the glass components in said upper dielectric layer.

27. The dielectric manufacturing method of claim 19 wherein said first primary glass powder and said second primary glass powder are present in their respective dielectric layers in the range of 50 to 100 volume percent, with respect to the total amount of the glass components in their respective dielectric layers.

28. The dielectric manufacturing method of claim 19 wherein said lower dielectric layer consists essentially of glass as the only inorganic component.

29. The dielectric manufacturing method of claim 19 wherein said upper dielectric layer consists essentially of glass as the only inorganic component.

30. The dielectric manufacturing method of claim 19 wherein said lower dielectric layer and said upper dielectric layer consist essentially of glass as the only inorganic component.

31. The dielectric manufacturing method of claim 19 wherein said first primary glass powder and said second primary glass powder are bismuth-type glass powders.

32. The dielectric manufacturing method of claim 31 wherein the first primary glass powder is selected from a Bi—Al—B—Si—Zn—Ba based glass powder or a Bi—Al—B—Si—Zn—Ca based glass powder.

33. The dielectric manufacturing method of claim 31 wherein the second primary glass powder is selected from a Bi—Al—B—Si—Zn—Ba based glass powder or a Bi—Al—B—Si—Zn—Ca based glass powder.

34. The dielectric manufacturing method of claim 33 wherein said second primary glass powder further comprises at least one element selected from the group consisting of Fe, V, Ti, Cu, and Co.

35. The dielectric manufacturing method of claim 19 wherein said lower dielectric layer and said upper dielectric layer are essentially lead free.

36. The dielectric manufacturing method of claim 19 wherein said lower dielectric layer and said upper dielectric layer are essentially free of filler.

37. The dielectric manufacturing method of claim 19 wherein said lower dielectric layer and said upper dielectric layer are essentially free of alkaline compounds.

* * * * *